United States Patent
Prasoody et al.

(10) Patent No.: US 9,522,644 B2
(45) Date of Patent: Dec. 20, 2016

(54) BUMPER ARRANGEMENT FOR A MOTOR VEHICLE

(71) Applicant: Benteler Automobiltechnik GmbH, Paderborn (DE)

(72) Inventors: Sivanathan Prasoody, Holland, MI (US); Mayank Gusain, Hudsonville, MI (US)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 0 days.

(21) Appl. No.: 14/792,172

(22) Filed: Jul. 6, 2015

(65) Prior Publication Data
US 2016/0297387 A1 Oct. 13, 2016

Related U.S. Application Data

(60) Provisional application No. 62/146,689, filed on Apr. 13, 2015.

(51) Int. Cl.
*B60R 19/34* (2006.01)
*B60R 19/18* (2006.01)

(52) U.S. Cl.
CPC ............... *B60R 19/18* (2013.01); *B60R 19/34* (2013.01); *B60R 2019/1866* (2013.01)

(58) Field of Classification Search
CPC .......... B60R 21/34; B60R 19/34; B60R 19/18; B05B 3/085; E01C 19/203; B60N 2/502; B62D 25/088; B62D 21/152; B62D 25/082

(Continued)

(56) References Cited

U.S. PATENT DOCUMENTS 3,843,182 A * 10/1974 Walls ...................... B60R 19/20
267/140
4,076,296 A * 2/1978 Ditto ...................... B60R 19/18
293/122

(Continued)

FOREIGN PATENT DOCUMENTS

DE 44 01 865 A1 8/1994
DE 102 09 721 A1 2/2003

(Continued)

*Primary Examiner* — Kiran B Patel
(74) *Attorney, Agent, or Firm* — Henry M. Feiereisen LLC

(57) ABSTRACT

A bumper arrangement for a motor vehicle includes a bumper arrangement for a motor vehicle, including a cross member made of a lightweight metal and constructed as multi-chamber section which has at least one front chamber and at least one main chamber, wherein the front chamber is arranged in front of the main chamber in longitudinal direction of the motor vehicle, wherein the main chamber has a greater cross sectional surface than the at least one front chamber, wherein the cross member has a front side facing in a driving direction of the motor vehicle and a rear side facing away from the driving direction, wherein the front side has a height in vertical direction of the motor vehicle, which is greater than a height of the rear side, wherein at least one wall of the at least one front chamber forms a portion of the front side; and crash boxes arranged in respective end regions of the cross member for coupling the bumper arrangement with the motor vehicle. The cross member can be formed as extruded part.

23 Claims, 10 Drawing Sheets

(58) Field of Classification Search
USPC .................. 296/181.09, 193.09, 203.02, 204
See application file for complete search history.

(56) References Cited

U.S. PATENT DOCUMENTS

| | | | | |
|---|---|---|---|---|
| 4,397,490 | A * | 8/1983 | Evans .................... | B60R 19/02 293/120 |
| 5,727,826 | A * | 3/1998 | Frank ..................... | B60J 5/042 293/102 |
| 6,138,429 | A * | 10/2000 | Baumgaertner ..... | B62D 21/152 29/897.2 |
| 6,481,690 | B2 * | 11/2002 | Kariatsumari .......... | B60R 19/18 293/102 |
| 7,338,099 | B2 * | 3/2008 | Okabe .................... | B60R 19/18 293/102 |
| 7,537,252 | B2 * | 5/2009 | Nagai .................... | B60R 19/18 293/102 |
| 7,699,367 | B2 * | 4/2010 | Evans .................... | B60R 19/18 293/102 |
| 8,016,331 | B2 * | 9/2011 | Ralston .................. | B60R 19/18 293/120 |
| 8,368,523 | B2 * | 2/2013 | Takahashi ............. | B60R 19/483 180/274 |
| 8,801,083 | B2 * | 8/2014 | Miyashita ............ | B62D 21/152 296/187.1 |
| 9,238,444 | B2 | 1/2016 | Terada ................... | B60R 19/18 |
| 9,290,139 | B2 * | 3/2016 | Lee ........................ | B60R 19/34 |
| 2002/0079711 | A1 * | 6/2002 | Kajiwara ............... | B60R 19/18 293/133 |
| 2004/0169381 | A1 * | 9/2004 | Evans .................... | B60R 19/18 293/121 |
| 2004/0232711 | A1 | 11/2004 | Frank | |
| 2005/0104392 | A1 * | 5/2005 | Liebhard ................ | B60R 19/18 293/132 |
| 2007/0228747 | A1 * | 10/2007 | Hodoya ................. | B60R 19/18 293/102 |
| 2010/0201139 | A1 * | 8/2010 | Hashimura ............ | B60R 19/18 293/133 |
| 2011/0031769 | A1 | 2/2011 | Löeffler | |
| 2011/0121587 | A1 * | 5/2011 | Handing ................ | B60R 19/18 293/133 |
| 2013/0001964 | A1 * | 1/2013 | Freundl .................. | B60R 19/18 293/133 |
| 2013/0099514 | A1 | 4/2013 | Kaneko et al. | |
| 2013/0168982 | A1 * | 7/2013 | Ashiya ................... | B60R 19/18 293/108 |
| 2013/0241218 | A1 * | 9/2013 | Tsuchida ................ | B60R 19/34 293/133 |
| 2013/0241219 | A1 | 9/2013 | Kaneko et al. | |
| 2014/0319860 | A1 * | 10/2014 | Braunbeck ............. | B60R 19/34 293/133 |
| 2015/0084355 | A1 | 3/2015 | Terada et al. | |
| 2015/0097384 | A1 * | 4/2015 | Conrod ............... | B21B 15/0007 293/102 |

FOREIGN PATENT DOCUMENTS

| | | |
|---|---|---|
| DE | 10 2004 002 948 | 8/2005 |
| DE | 10 2009 048 391 | 4/2011 |
| DE | 10 2010 060 157 | 4/2012 |
| DE | 10 2012 109 998 | 4/2013 |
| DE | 10 2011 121 381 | 6/2013 |
| DE | 10 2013 102 546 | 9/2013 |
| EP | 2 082 924 A1 | 1/2008 |
| JP | H 08276804 A | 10/1996 |
| WO | WO 2007/136331 | 11/2007 |

* cited by examiner

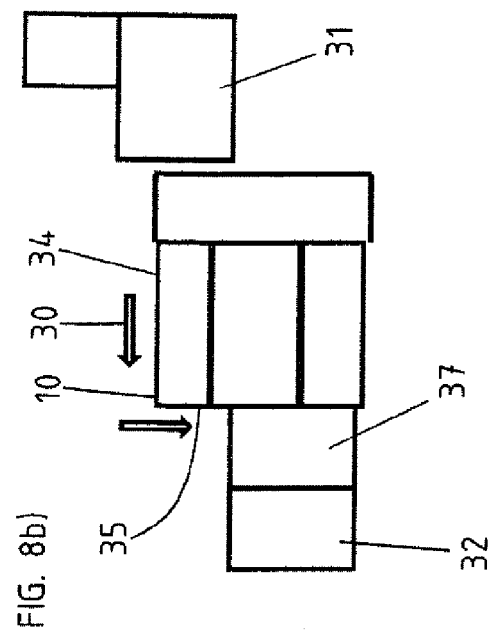
FIG. 8b) prior art
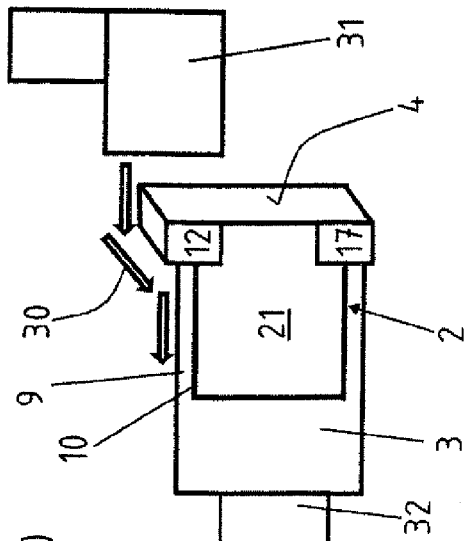
FIG. 8a)
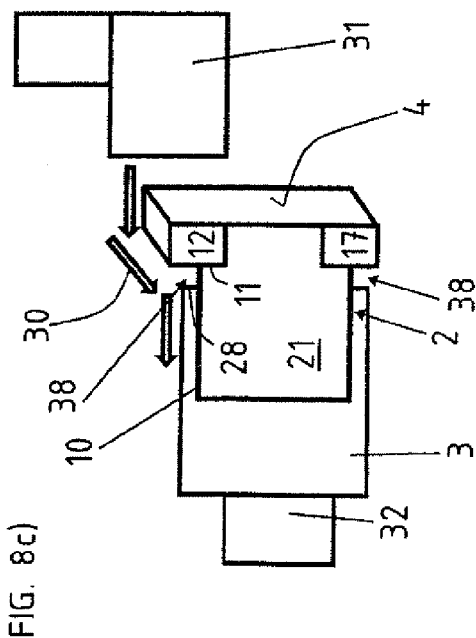
FIG. 8c)

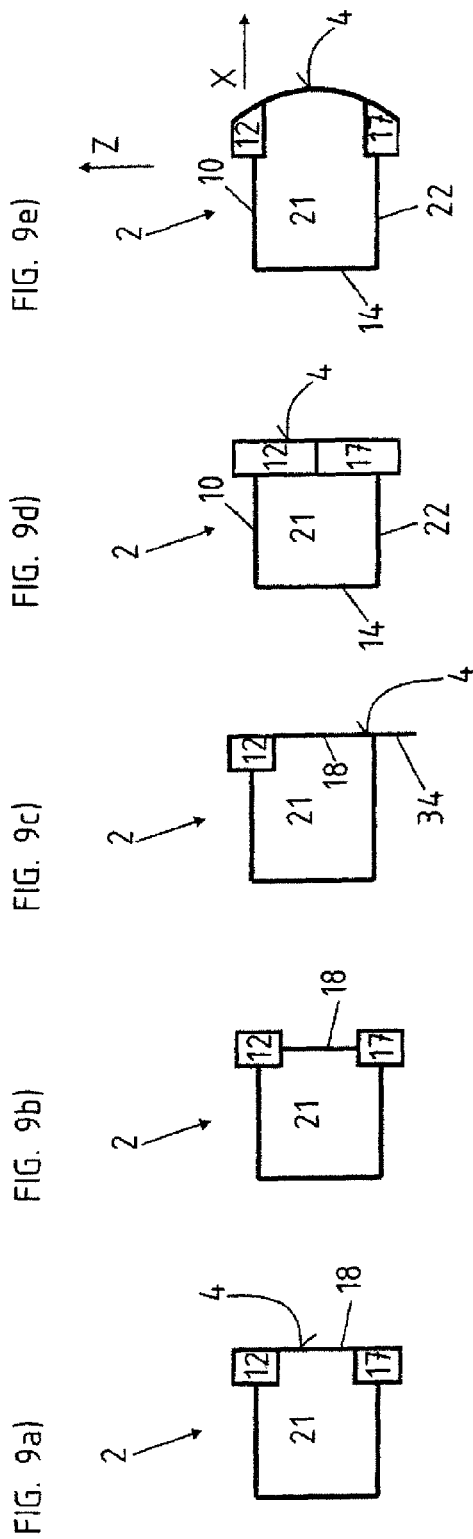

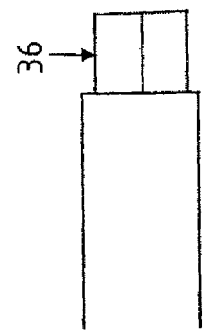
FIG. 10a)
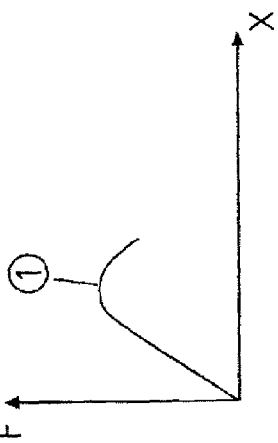
FIG. 10d) prior art
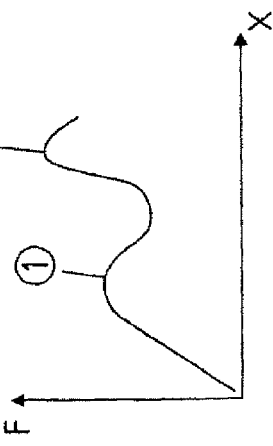
FIG. 10b)
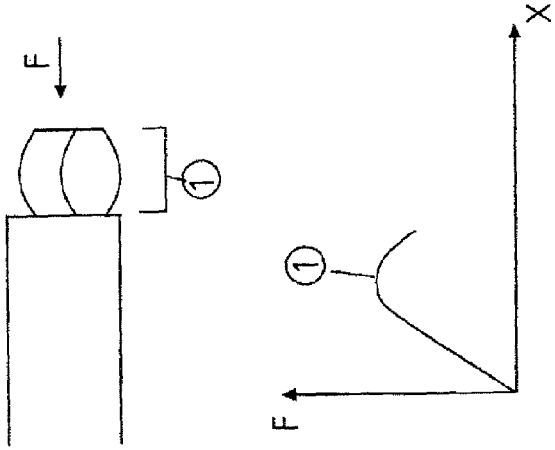
FIG. 10e)
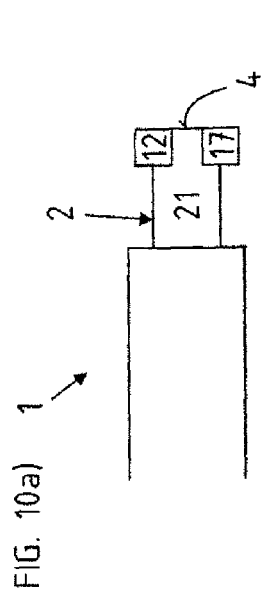
FIG. 10c)
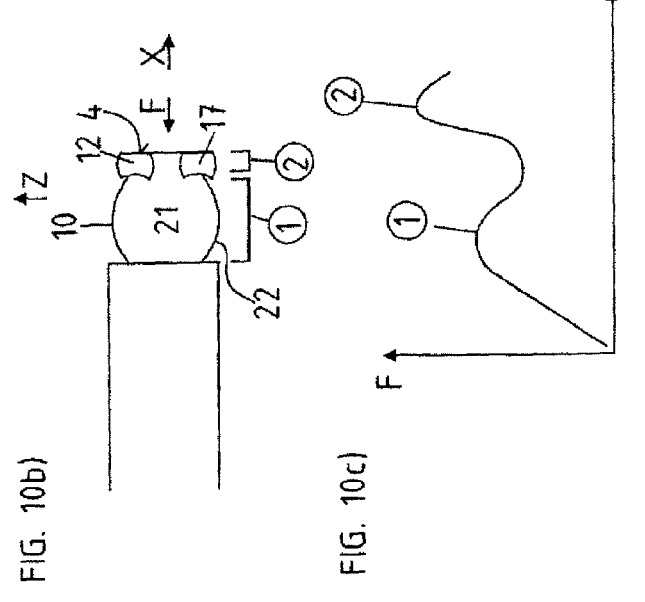
FIG. 10f)

BUMPER ARRANGEMENT FOR A MOTOR VEHICLE

CROSS-REFERENCES TO RELATED APPLICATIONS

This application claims the benefit of prior filed U.S. provisional Application No. 62/146,689, filed Apr. 13, 2015, pursuant to 35 U.S.C. 119(e), the disclosure of which is incorporated herein by reference.

BACKGROUND OF THE INVENTION

The present invention relates to a bumper arrangement for a motor vehicle.

The following discussion of related art is provided to assist the reader in understanding the advantages of the invention, and is not to be construed as an admission that this related art is prior art to this invention.

From the state-of-the-art bumper arrangements are known which are arranged on the front side or rear side of a motor vehicle. For this purpose the bumper arrangements have a cross member, which essentially extends over at least a part of the width of the motor vehicle body. The cross member is to be configured as bending-stiff as possible so that the different impact scenarios, for example collision with a pole, a bumper-to-bumper crash or also the collision with an obstacle, and here in particular with overlap, also known as offset-crash, are accounted for and an uncontrolled entering into the motor vehicle is prevented.

In order to absorb the kinetic energy generated in such a crash, such a known cross member is also coupled with the motor vehicle body, and in particular with the longitudinal members, via crash boxes. The crash boxes are configured so as to undergo deformation as a result of the impact and thus convert kinetic energy into deformation energy by cold deformation. In most cases the crash boxes are coupled with the front longitudinal members of the motor vehicle body in order to introduce the additional crash energy into them. The load path thus extends from the cross member via the crash boxes into the longitudinal members of the motor vehicle.

A good crash performance is associated with a high stiffness of the cross member and a high energy absorption capacity of the crash box and the cross member, which is realized by dimensioning the components large. However, these large dimensions of the components result in a high own weight and require a large amount of space.

The known bumper arrangements thus conflict with the goal of a smallest possible own weight, while at the same time providing good crash performance and requiring little installation space.

From EP 2 024 201 B1 a bumper arrangement is known which has a cross member which has a high stiffness as a result of various stiffening embossments and as a result of being subjected as a steel component to hot forming and press hardening technologies, while at the same time having small dimensions. In order to enable a sufficient overlap in case of a bumper-to-bumper crash with another motor vehicle, the cross member also has an asymmetric middle section to sufficiently vertically overlap a centerline of the cross member of an impacting motor vehicle. A problem associated therewith is however that an impact causes twisting about the longitudinal axis of the cross member.

Further, cross members are known from the state of the art that are made of lightweight metal extruded sections. For example from US 2015/0084355 A1 a bumper arrangement is known with a cross member as lightweight extruded section. In this case the overlap in case of a bumper-to-bumper crash and the stiffness of the cross member are realized by a corresponding total height of the cross member relative to the vertical direction of the motor vehicle.

It would therefore be desirable and advantageous to provide a bumper arrangement, which requires a small construction space while at the same time offering high crash performance and having a small own weight.

SUMMARY OF THE INVENTION

According to one aspect of the present invention, a bumper arrangement for a motor vehicle, including a cross member made of a lightweight metal and constructed as multi-chamber section which has at least one front chamber and at least one main chamber, said front chamber being arranged in front of the main chamber in longitudinal direction of the motor vehicle, wherein the main chamber has a greater cross sectional surface than the at least one front chamber, wherein the cross member has a front side facing in a driving direction of the motor vehicle and a rear side facing away from the driving direction, wherein the front side has a height in vertical direction of the motor vehicle, which is greater than a height of the rear side, wherein at least one wall of the at least one front chamber forms a portion of the front side; and crash boxes arranged in respective end regions of the cross member for coupling the bumper arrangement with the motor vehicle. The cross member can be formed as extruded part.

According to another advantageous feature of the present invention, the cross member can have two of the front chambers, wherein a respective wall of each of the two front chambers forms a portion of the front side.

The bumper arrangement can be arranged on the front side of the motor vehicle as well as the rear side of the motor vehicle. On the front side, the driving direction is in this case the forward driving direction. When mounting the bumper arrangement on the rear side, the driving direction corresponds to the backward driving direction.

According to the invention configuring the cross member as multi-chamber profile made of a lightweight alloy, in particular of an aluminum alloy, makes it possible to form the cross member with a particularly small own weight and at the same time high stiffness. For this, wall thicknesses that in particular differ in cross section, are realized. Requirements of different crash scenarios are well met due to the fact that in relation to the vertical direction of the motor vehicle the front side of the cross member has a greater height relative to the height of the rear side of the cross member. Preferably the height of the rear side is 40% to 90% of the height of the front side. In the region of the rear side of the cross member oftentimes peripheral components of the motor vehicle, for example a motor vehicle radiator, tubing, connection tubes, lines or other components are arranged so that the smaller height here also saves construction space and at the same time avoids damage to bordering components also in the case of deformation of the cross member resulting from a torsion about the longitudinal axis in the case of cross members which collide with each other at a vertical offset. Similarly the entering and damage to components in the motor space of the motor vehicle associated therewith are avoided or decreased.

The increased crash performance at small own weight is also achieved in that the cross member is configured as multi-chamber section with at least one, preferably two front chambers facing in driving direction and a main chamber which in driving direction is situated or arranged behind the front chambers. The aforementioned specifications respectively relate to the cross section of the cross member. The impacting obstacle thus first impacts the front chamber or front chambers. In the case of two front chambers these can be arranged directly adjacent above each other in relation to the vertical direction of the motor vehicle. The front chambers can however also be arranged at a distance to each other, wherein in this case the front chambers are connected to each other via a web. The in driving direction frontward-facing walls or wall surfaces of the front chambers then simultaneously form at least a part of the front side of the cross member. The remaining part is formed by the web. In the case of only one front chamber the remaining portion of the front side forms the web. In the case of directly adjacent front chambers these form the entire front side of the cross member.

The cross sectional surface of the main chamber is greater than the cross sectional surface of the front chamber. In the case of two front chambers the cross sectional surface of the main chamber is greater than the cross sectional surface of either of the two front chambers. The cross sectional surfaces of the front chambers can have different sizes compared to each other or can have identical cross sectional surfaces. Particularly preferably the cross sectional surface of the main chamber is also greater than the cross sectional surface of both front chambers taken together.

The web can be set back in cross section in relation to the longitudinal direction of the motor vehicle, so that the front side of the cross member is not planar. Preferably the web is arranged so that the front walls of the front chambers together with the web form the front side and the front side is configured substantially planar in cross section and is in particular oriented in vertical direction of the motor vehicle.

For achieving the greater height of the front side of the cross member relative to the rear side, in each case with respect to the vertical direction of the motor vehicle, the front chambers are arranged so as to protrude above and below the main chamber, in particular with a stepped shoulder or stepped offset. This means that the top side of the upper front chamber and the bottom side of the lower front chamber are spaced apart at a distance which corresponds to the height of the front side, and the height of the front side is greater than the height of the rear side. Edges and round portions are not taken into consideration for this. The height of the rear side is also the height of the main chamber insofar as the main chamber has a rectangular cross section. Thus the main chamber in each case transitions on the top side into the top front chamber with a stepped offset and on the bottom side into the lower front chamber.

For this the main chamber is formed in cross section in particular by the rear side, an upper chord and a lower chord, the corresponding portions on the front chambers and the web, which is optionally arranged on the front side. The rear side of the main chamber, which at the same time constitutes the rear side of the cross member, and the web are arranged to extend in vertical direction of the motor vehicle. The upper chord and the lower chord are oriented in longitudinal direction of the motor vehicle, preferably so as to extend at an angle between $-20$ and $+20'$ relative to the longitudinal direction of the motor vehicle. The parts of the front chambers, which contribute to the formation of the main chamber, are correspondingly arranged to extend in longitudinal and vertical direction of the motor vehicle. The front chambers are further preferably configured substantially rectangular in cross section. The main chamber preferably also has a rectangular, in particular square cross section, wherein the rectangular cross section is at least partially interrupted due to the part of the main chamber that is formed in cross section by the front chambers.

A particularly good force path or load path results from the fact that the upper chord and the lower chord of the main chamber, viewed in cross section, respectively transition into a middle height region of the rear side of the front chambers in the following also referred to as middle region. In particular the upper chord and the lower chord are substantially orthogonal relative to the respective rear side of the front chambers, and thus abut the same. An impact with high intensity would in this case lead to an additional energy absorption, owing to the fact that the upper chord causes a deformation of the rear side of the upper front chamber and the lower chord causes the rear side of the lower front chamber to be pushed in. This also converts kinetic energy into deformation energy and increases crash performance. At the same time the deformation increases the bending stiffness of the cross member itself, in that at least locally a longitudinal embossment is formed in the rear wall of the front chamber.

A further significant aspect of the invention is that the cross member has a longitudinal extent, which is oriented in transverse direction of the motor vehicle. Thus the longitudinal axis of the cross member is arranged so as to face in transverse direction of the motor vehicle. For this purpose the cross member further has preferably a curvature over its longitudinal extent, wherein the curvature is oriented in longitudinal direction of the motor vehicle. Thus the cross member is configured slightly bent toward the front in longitudinal direction of the motor vehicle. As an alternative or in addition the cross member has in relation to its longitudinal direction a middle section, which is bent or formed asymmetrically in vertical direction of the motor vehicle. In particular, the asymmetric middle section is formed upward in vertical direction of the motor vehicle. The middle section can also be offset parallel to the longitudinal axis of the cross member in relation to the vertical direction of the motor vehicle. This results in a respective transition section. In the bumper-to-bumper crash scenario this achieves a good overlap for an impacting bumper especially in the case of mid-sized passenger cars or in the case of small or very small-sized cars. The body of such small-sized motor vehicles, and in particular the longitudinal members of such vehicles, are often arranged lower in relation to the vertical axis of the motor vehicle than the center line of luxury vehicles, SUVs or even utility vehicles. The asymmetrically upwards formed middle section results in a higher overlap with the aforementioned vehicles. In particular the configuration as multi-chamber section nevertheless makes it possible to realize a sufficient bending stiffness of the cross member.

In this regard the cross member is further preferably configured so that it has different wall thicknesses in cross section, wherein the upper front chamber preferably has a greater wall thickness than the lower front chamber. When an opposite arrangement of the bumper arrangement according to the invention is to be realized for example on an SUV, the middle section would preferably be oriented downwards. In this case the lower front chamber would have a greater wall thickness compared to the upper front chamber. Further particularly preferably the wall thickness of the main chamber is greater than or equal to the wall thickness of the lower front chamber. In particular the wall thickness of the main chamber is smaller than or equal to, and particularly preferably smaller than, the upper front chamber. This makes it possible to achieve an optimal crash performance using a small amount of material and with this a small own weight of the cross member, without adversely affecting the crash performance of the bumper arrangement because a high bending stiffness of the cross member is realized.

According to another advantageous feature of the present invention, each front chamber has a height, which corresponds to 20% to 60%, preferably 25% to 50%, in particular 30% to 40% and substantially to ⅓ of the height of the main chamber. The height again relates to the vertical direction of the motor vehicle. The front chambers can each have the same height. Within the scope of the invention it is also possible however that the front chambers have different heights. Preferably the upper front chamber has a greater height than the lower front chamber, in particular in the case of an upwardly arranged middle section of the cross member.

According to another advantageous feature of the present invention, the rear side of the cross member transitions respectively rounded into the upper chord and the lower chord. This makes it possible to limit the damage associated caused as a result of the cross member penetrating the motor space or the passenger compartment. In the case of a slight torsion and/or rotation of the cross member about its longitudinal axis damage a connection tube or the like, for example caused by a 90° edge, is decreased by the rounded transition region from the rear side to the upper chord or rear side to the lower chord.

According to another advantageous feature of the present invention, the cross member is made of an aluminum alloy, in particular of a 6000 or 7000 aluminum alloy. The cross member has particularly preferably a yield strength Rp02 between 200 MPa and 500 MPa, particularly preferably between 300 MPa and 450 MPa. Particularly preferably the material of the cross member is further increased by a hot or cold ageing treatment.

The bumper arrangement according to the invention further includes a crash box. The crash box described in the following can be considered independent within the scope of the invention also with its respective features and associated properties, in the absence of the cross member described above.

The crash box according to the invention is configured as hollow section, wherein the hollow section has a rectangular cross sectional configuration. The hollow section can be configured one-piece and be made of a uniform material, but can also be constructed two-part or multi-part. When the crash box is mounted on the motor vehicle the center longitudinal axis of the crash box extends in longitudinal direction of the motor vehicle. A top side of the crash box and a bottom side of the crash box each have two bulges, wherein the bulges are oriented outward relative to an internal space of the hollow section of the crash box. The round portions of the bulges are oriented in vertical direction of the motor vehicle. Thus the bulges of the top side of the crash box are oriented upwards in vertical direction of the motor vehicle and the bulges of the bottom side of the crash box are oriented downwards in vertical direction of the motor vehicle. The bulge itself is formed over a longer extent, in the manner of an outwardly oriented embossment. The extent of the bulge is oriented in longitudinal direction of the motor vehicle. This extent of the bulges thus increases the stiffness of the crash box and the energy absorption capacity in longitudinal direction of the motor vehicle, and also ensures that the cross member remains connected to the crash box also in the case of a rotational movement resulting from a bumper to bumper crash constellation which is offset in vertical direction of the motor vehicle. Overall more crash energy is thus absorbed per completed deformation path of the crash box along the longitudinal direction of the motor vehicle.

According to another advantageous feature of the present invention, the crash box is configured fork-shaped toward the front side and at least partially receives the cross member in the fork opening in longitudinal direction of the motor vehicle. For this the upper chord of the cross member is overlapped at least partially, in particular completely, by the top side of the crash box and the lower chord is partially, in particular completely, overlapped by the bottom side of the crash box. The cross member further preferably is not only coupled form-fittingly in this region with the crash box. The coupling is preferably additionally accomplished by a riveting process or particularly preferably by a screw connection. This enables also a simple and easy mounting and demounting of the cross member, in particular pre-mounting of the entire bumper arrangement, so that the bumper arrangement can be mounted on the motor vehicle in a complete state. Further particularly preferably a spacer sleeve may be arranged in the interior of the cross member, in particular in the main chamber, so that a screw connection is formed from the top side of the crash box to the bottom side of the crash box and traversing the cross member. As an alternative a welding of the crash box on the topside and bottom side of the cross member, in particular on the upper chord and/or the lower chord is possible.

The particularly good crash performance of the bumper arrangement is further achieved in that the crash box is configured so that the top side of the crash box rests, in particular with the front ends of the bulges, against a rear wall of the upper front chamber of the cross member and the bottom side of the crash box rests, in particular with the front ends of the bulges, against a rear wall of the bottom front chamber. A crash introduced on the front side of the cross member is thus transmitted via the front chamber directly to the crash box or the bulges of the crash box. In the case of only one front chamber the web is extended with a flange on the cross member on the side opposite the front chamber in vertical direction of the motor vehicle. The front end of the bulge of the crash box then directly abuts the flange.

According to another advantageous feature of the present invention, the crash box has a flange which laterally protrudes in transverse direction of the motor vehicle, and which abuts the rear wall of the cross member and is in particular coupled with the rear wall of the cross member. The coupling can again be realized by a riveting process, and particularly preferably by a screw connection. Together with the coupling of the top side of the crash box and the bottom side of the crash box with the cross member thus a three sided coupling is achieved, which in particular prevents rotation or torsion of the cross member in the case of a crash.

According to another advantageous feature of the present invention, the crash box can also be configured one-piece and of a uniform material, in particular of a lightweight alloy, preferably an aluminum alloy. Thus it is possible to produce the crash box using the extrusion process. A rear plate or flange plate can be coupled to the crash box, with which rear plate or flange plate the entire bumper arrangement is then coupled to the motor vehicle body and here in particular in the region of the front ends of the longitudinal members of the motor vehicle body.

When producing a one-piece crash box made of a uniform material it is possible to produce the crash box as extruded section and subsequently to process the crash box by cutting and forming, so that the top side of the crash box and the bottom side of the crash box and the laterally protruding flange are formed.

In this the case the crash box also may have different wall thicknesses in cross section. Preferably strips that extend in longitudinal direction of the motor vehicle are configured with a greater wall thickness than the remaining regions of the crash box. Particularly preferably the strips are configured so as to extend from the flange plate of the crash box at least partially in the region of the bulges over the entire longitudinal extent of the crash box so that the region with greater wall thickness and thus higher stiffness is formed from the flange plate of the crash box up to the rear wall of the front chamber of the cross member, in particular in the region of the bulge.

This again makes it possible that especially the crash or impact introduced via the front chambers has an optimal load path through the crash box due to the strip with higher wall thickness up to the flange plate, and at the same time enables a targeted deformation also in the case of a bumper to bumper crash constellation which is offset in vertical direction of the motor vehicle.

BRIEF DESCRIPTION OF THE DRAWING

Other features and advantages of the present invention will be more readily apparent upon reading the following description of currently preferred exemplified embodiments of the invention with reference to the accompanying drawing, in which:

FIGS. 8a to 8c show the load path through a bumper arrangement according to the invention and a bumper arrangement known from the state of the art and FIGS. 9a to 9e show cross sectional views of different variants of the cross member.

FIGS. 10a to 10f show a bumper arrangement according to the invention prior to and after a crash, with force level course compared to a bumper arrangement known form the state of the art.

DETAILED DESCRIPTION OF PREFERRED EMBODIMENTS

Figure 1:
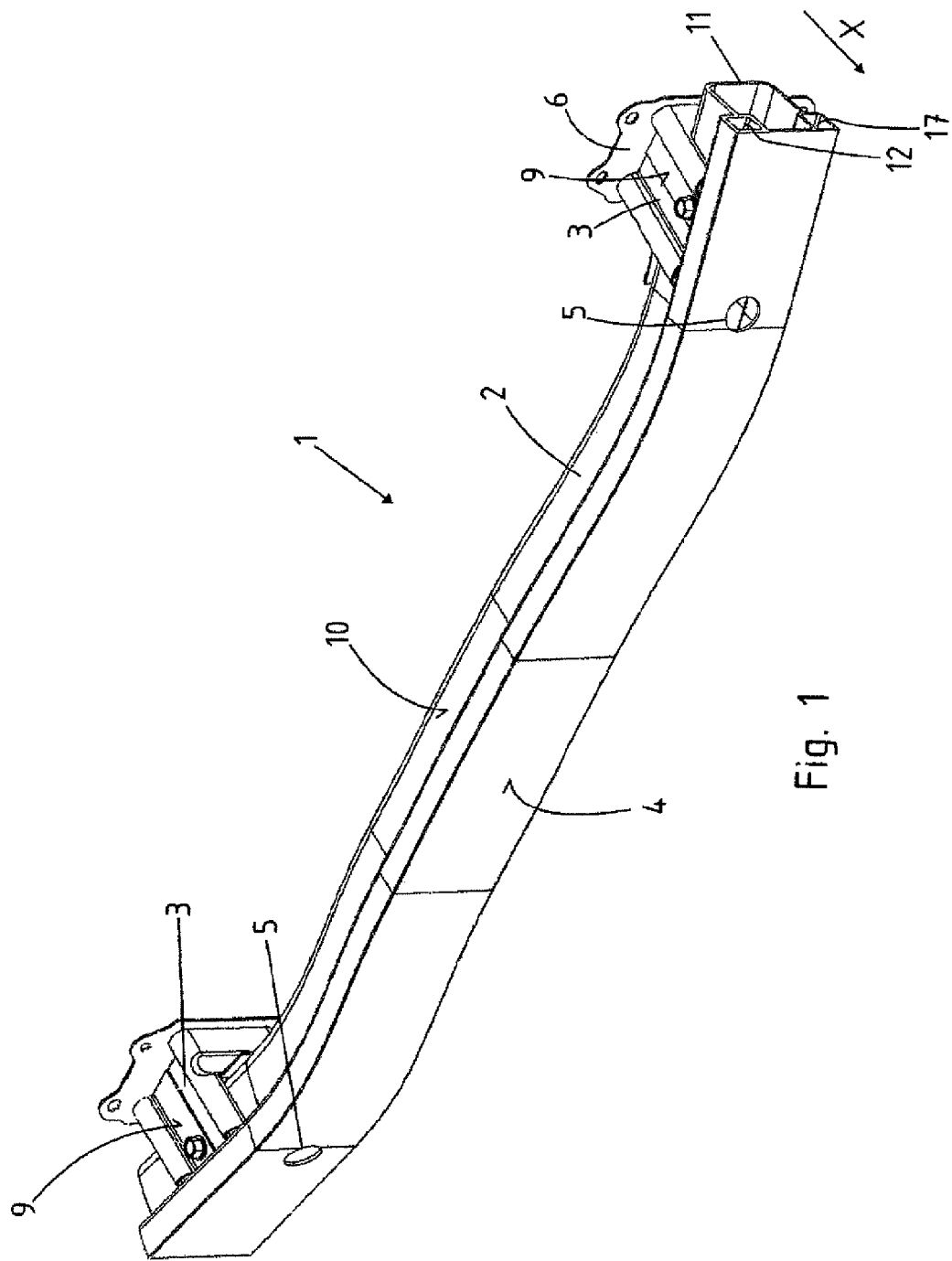
FIG. 1 shows a perspective view of the bumper arrangement according to the invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a bumper arrangement 1 according to the invention in a perspective view. The bumper arrangement 1 has a cross member 2 and crash boxes 3 respectively arranged in a respective end region of the cross member 2. The cross member 2 itself has a planar front side 4 and is configured as multi-chamber hollow section. The multi-chamber hollow section is shown and described in more detail in FIG. 7. In the front side mounting holes 5 are formed, in order to arrange a not further shown towing eye which traverses the cross member 2. On the crash boxes 3 flange plates 6 are fastened via which the crash boxes can be coupled to the motor vehicle body or the longitudinal member of the motor vehicle body in a not further shown manner.

Figure 2:
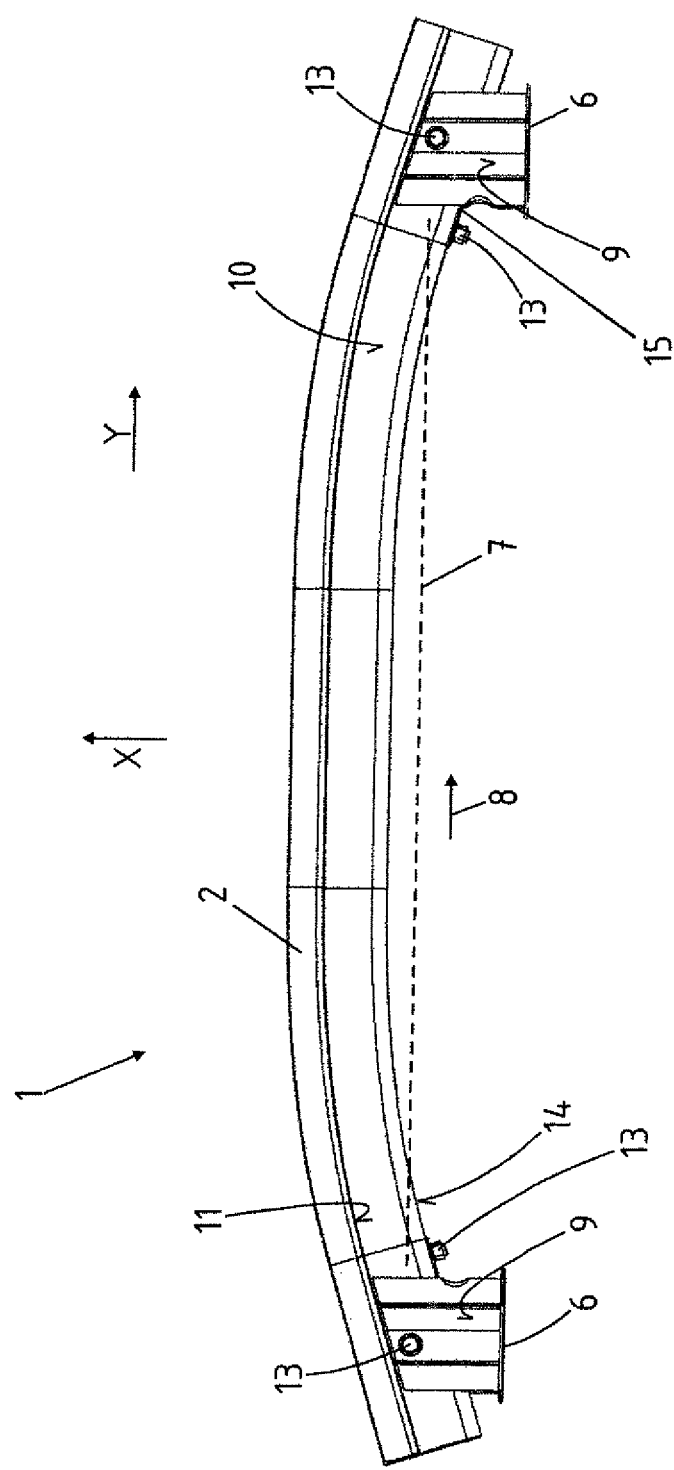
FIG. 2 shows a top view onto the bumper arrangement according to the invention.

The cross member 2 is initially produced as extruded section and is subsequently processed by forming and/or cutting. For this a curvature is formed in longitudinal direction X of the motor vehicle, as in particular shown in FIG. 2. The curvature is such that the curvature arch faces in longitudinal direction X of the motor vehicle, wherein the longitudinal direction 8 extends arch-shaped in transverse direction Y of the motor vehicle. Thus the cross member 2 has an arched course along is center longitudinal axis 7. It can also be seen well that a respective crash box top side 9 overlaps an upper chord 10 of the cross member 2 and thereby abuts a rear wall 11 of the upper front chamber 12, shown in FIG. 7. Further the cross member 2 is coupled with the crash boxes 3 via a respective screw connection 13 between the crash box top side 9 and the upper chord 10. Further, screw connections 13 are configured so that the rear side 14 of the cross member 2 is coupled with laterally protruding flanges 15 of the crash box 3 also by means of screws.

Instead of the screw connection it is also possible to weld the crash boxes and the cross member together. For this the crash box top side 9 and the crash box bottom side 26 can preferably be coupled to the upper chord 10 and the lower chord 22 by welding connections, in particular the front walls 28 of the bulges 27 can alternatively or in addition be coupled to the rear walls 11, 24 of the front chambers 12, 17 of the cross member 2.

Figure 3:
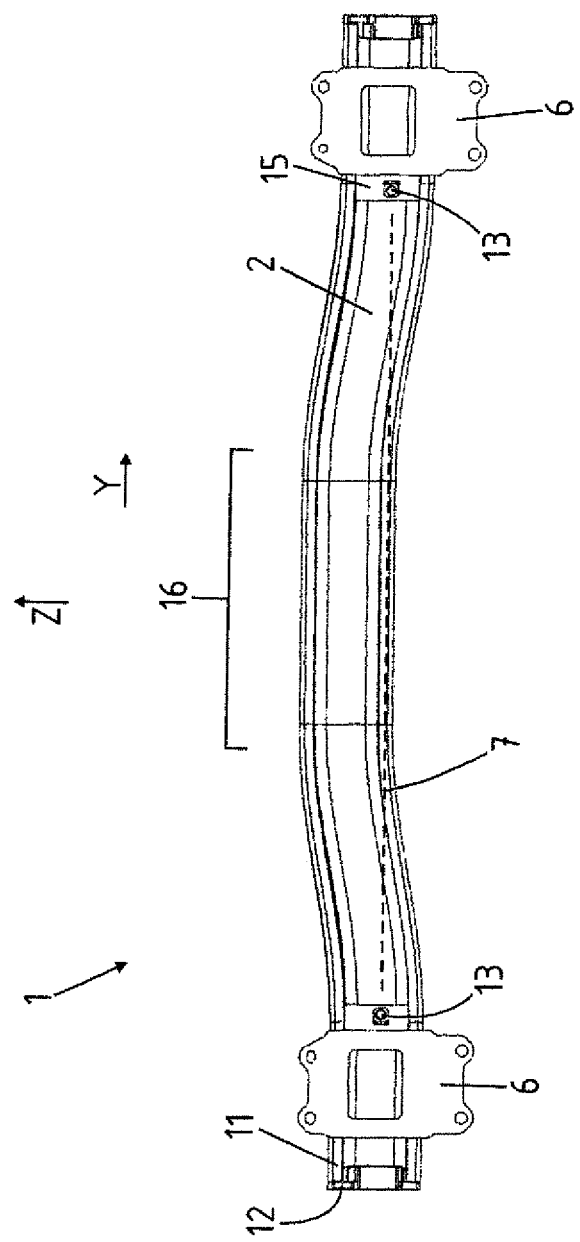
FIG. 3 shows a rear view of the bumper arrangement according to the invention.
Figure 4:
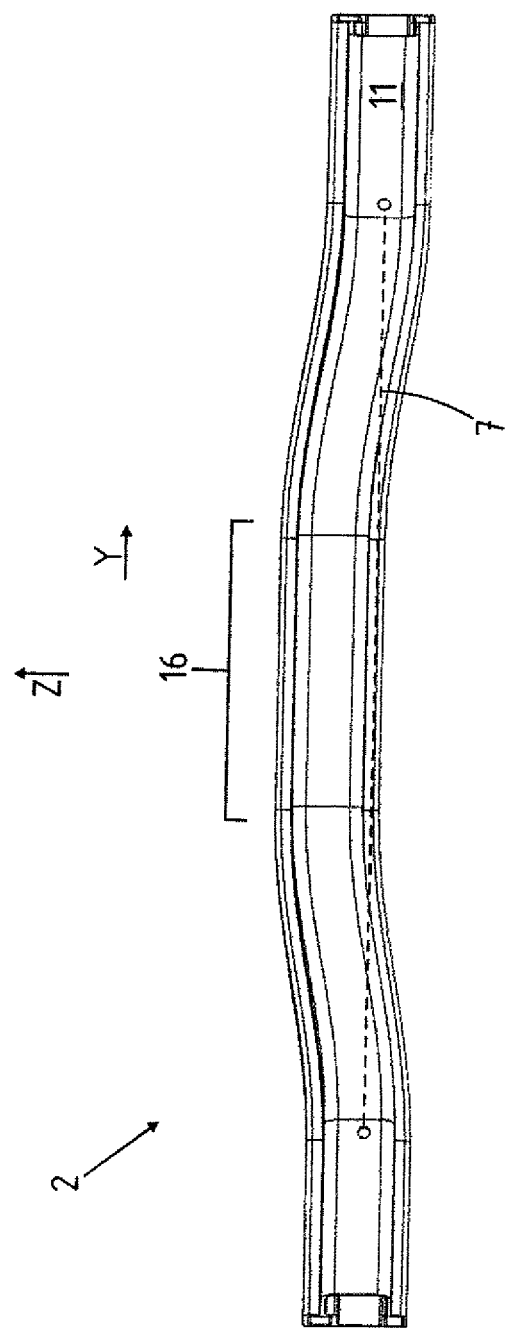
FIG. 4 shows a rear view of the cross member.

FIG. 3 shows a rear view of the bumper arrangement 1 according to the invention, and FIG. 4 a rear view of only the cross member 2. It can be recognized well that in relation to the vertical direction Z of the motor vehicle, a middle section 16 of the cross member 2 is oriented upwards and offset parallel to the center middle axis 7. Due to this upwardly offset center section 16 a highest possible overlap relative to the vertical direction Z of the motor vehicle is achieved in the case of a bumper-to-bumper crash.

Figure 7:
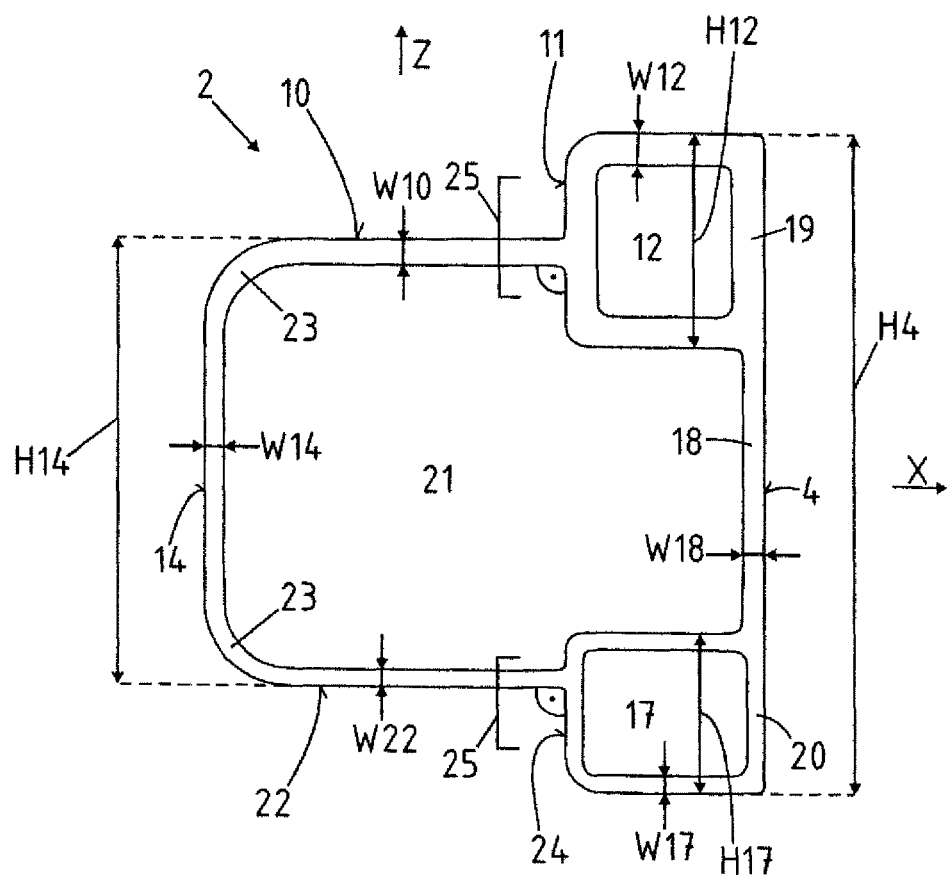
FIG. 7 shows cross sectional view of the cross member according to the invention.

As shown in FIG. 7 in particular the upper front chamber 12 has a greater wall thickness W12 relative to a lower front chamber 17, which has a relative smaller wall thickness W17. Between the upper and the lower front chamber 12, 17 a web 18 is arranged which connects the upper and lower front chambers. The front wall 19 of the upper front chamber 12 and the front wall 20 of the lower front chamber 17 and the web 18 together form the front side 4 of the cross member 2 which is plan in cross section. The web 18 itself has a wall thickness W18 which is smaller than or equal to the wall thickness W12 of the upper front chamber 12 and greater than or equal to the wall thickness W17 of the lower front chamber 17.

The main chamber 21 itself forms the third chamber of the multi-chamber hollow section, wherein all chambers have a substantially rectangular cross sectional course. The main chamber 21 itself is formed by the upper chord 10, a lower chord 22 and the rear side 14. The rear side 14 hereby transitions respectively via a rounded portion 23 into the upper chord 10 or the lower chord 22. The upper chord 10 and the lower chord 22 and the rear side 14 preferably each have a wall thickness W10, W22, W14, which is smaller than or equal to the wall thickness W12 of the upper front chamber 12 and greater than or equal to the wall thickness W17 of the lower front chamber 17.

It can also be seen well that the height H14 of the rear side 14 is smaller than the height H4 of the front side 4 of the cross member 2. As a result a largest possible impact surface, is provided on the front side 4 for impact with a bumper, a pole or other obstacle. The front chambers 12, 17 ensure a correspondingly high stiffness. The height H14 of the rear side 14 on the other hand results in a small construction space requirement and a low risk of damage during penetration of the cross member 2 into the motor space.

It can also be seen well in FIG. 7 that the upper chord 10 and the lower chord 22 each transition into the rear wall of the upper front chamber 12 and the rear wall 24 of the lower font chamber 17, in particular with a right angle. Preferably the upper chord 10 or the lower chord 22 each transition into the rear wall 11 in a middle region 25 of the rear wall 11 so that an ideal load path results while at the same time enabling deformation of the multi-chamber hollow section. The height H12 of the upper front chamber 12 and the height H17 of the lower front chamber 17 can be equal but also different from each other. For the case that the middle section is offset parallel upward in relation to the vertical direction of the motor vehicle according to FIG. 3, the height H12 of the upper front chamber 12 is preferably greater than or equal to the height H17 of the lower front chamber 17. Preferably the height H12, H17 of the respective front chamber 12, 17 corresponds to 20% to 60% of the height 21 of the main chamber 21.

Figure 6:
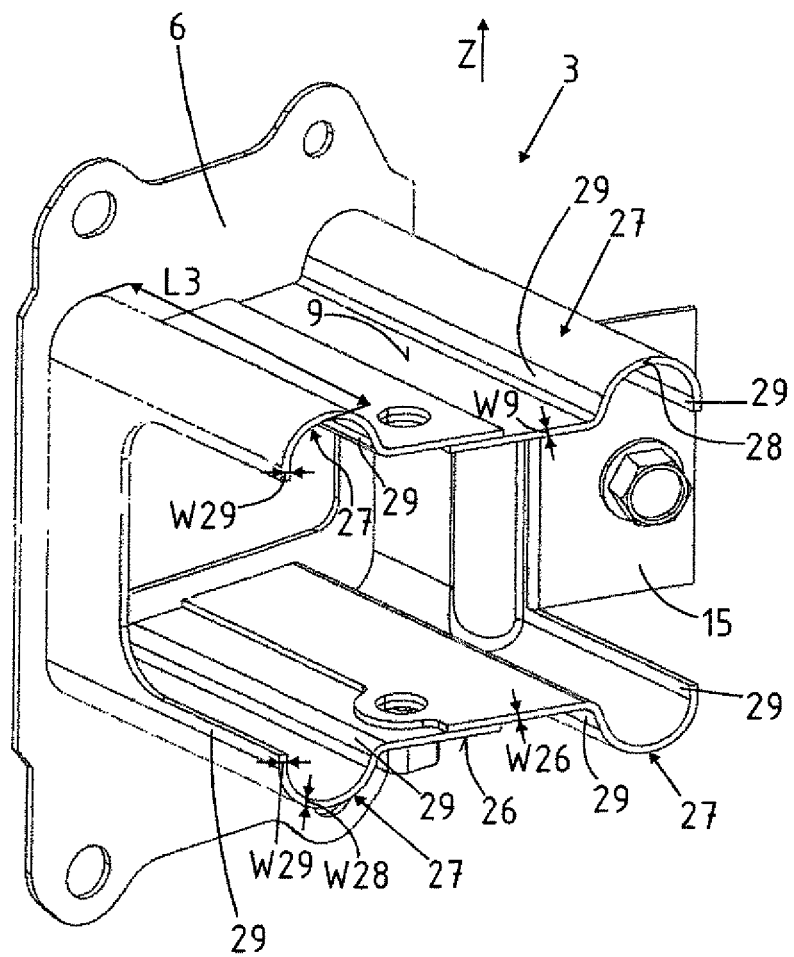
FIG. 6 shows a cross sectional view of the crash box according to the invention.

Further, the crash box 3 according to the invention is well shown in the perspective view of FIG. 6. FIG. 6 shows the flange plate 6, which is fastened on the rear side 14 of the crash box 3, and illustrates that the crash box 3 itself is configured as a hollow component. Via its cross sectional course according to FIG. 6 the crash box 3 itself is configured as a two-part component, the crash box 3 can however also be configured as a one-piece component made of a uniform material, in particular as a single extruded component.

In particular, bulges 27 are formed on the crash box top side 9 and on the crash box bottom side 26, wherein the bulges 27 of the crash box bottom side 9 are oriented upwards in relation to the vertical direction Z of the motor vehicle and the bulges 27 are oriented so as to point downward in relation to the vertical direction Z of the motor vehicle. The respective bulges 27 extend over the respective length of the crash box 3 so that a front edge or a front end of each of the bulges 27, drawn in only exemplary on the upper right hand side, abut form-fittingly on the respective rear wall 24 of the front chamber 17 of the cross member 2.

Figure 5:
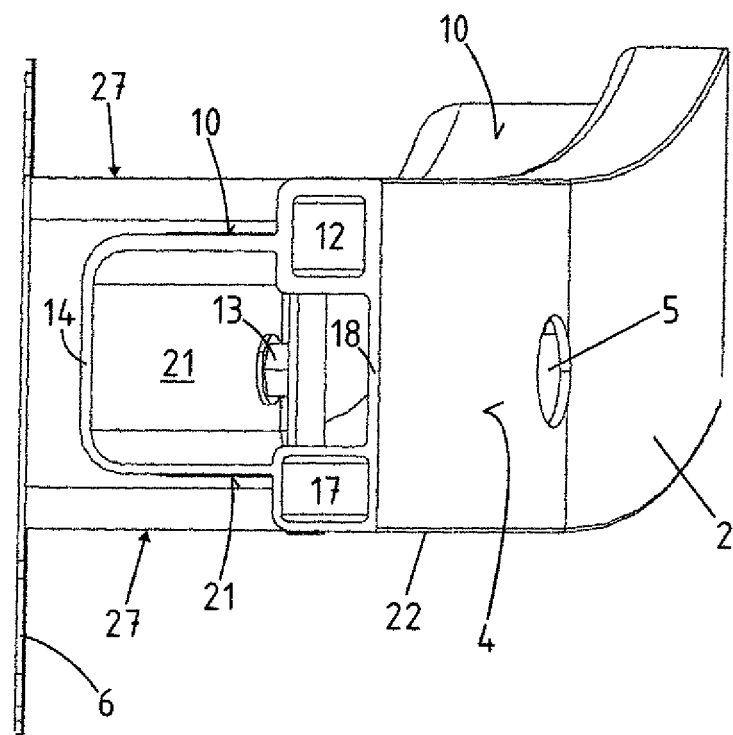
FIG. 5 shows a side view of bumper arrangement.

Further particularly preferably, the crash box 3 has in cross section different wall thicknesses W27, wherein in particular in the end regions of the bulges 27 strips 29 are formed, wherein the wall thickness W29 of the strips 29 is greater than the remaining wall thickness W27, for example of the bulge 27 and/or on the crash box top side or crash box bottom side 26. These strips 29 then also extend over the entire length of the crash box 3 so that these strips 29 extend with an increased wall thickness W29 and at the same time higher stiffness from the flange plate 6 up to the rear wall 24 of the front chamber 17. The strips 29 then respectively abut form-fittingly at a right angle on the upper chord 10 or the lower chord 22 of the main chamber 21 of the cross member 2. This can be well seen in FIG. 5.

It can also be well recognized that the crash box top side 9 and the crash box bottom side 26 are configured fork-shaped, so that a reception region for form-fitting and in particular fork-shape reception of the cross member 2, and here in particular the main chamber 21, results so that the upper chord 10 and the lower chord 22 of the main chamber 21 are overlapped and the crash box 3 is configured to abut the rear side 14 of the cross member 2.

FIG. 8 shows bumper to bumper crash scenarios with an offset in vertical direction 7 of the motor vehicle.

FIG. 8 shows a load path 30. In case of a collision with an obstacle 31, crash energy is introduced via the front side 4 and passes in this case through the upper front chamber 12 via the upper chord 10 and the crash box top side 9, the crash box 3 and is transmitted into a longitudinal member 32 arranged downstream of the upper chord 10. In contrast, FIG. 8c shows a modified embodiment, wherein a gap 38 is formed between the front wall 28 of the crash box top side 9 and the rear wall 11 of the upper front chamber 12. In case of an impact of an obstacle 31 thus the upper chord 10 is deformed first, before the front wall 28 impacts the rear wall 11 of the upper front chamber 12. Only when the gap 38 is reduced to zero, the rear wall 11 of the upper front chamber 12 is noticeably deformed as a result of the additional impact of the crash box top side 9. In contrast, FIG. 8a shows a load path 30 according to the state of the art. In this case the load path, while also being guided via the shown upper chord 10 in case of an impact with an obstacle 31, it is then abruptly interrupted at a rear wall 35 and is then again conducted into a longitudinal member 32 or the crash box 3 arranged before the longitudinal member.

FIGS. 9a to 9e each show cross sectional views through different embodiments of the cross member 2. FIG. 9a shows the already described embodiment with upper and lower front chamber 12, 17 and main chamber 21 and the web 18 connecting the latter. According to FIG. 9b the web 18 is set back relative to the front side and connects the upper and lower front chamber 12, 17.

In the embodiment according to FIG. 9c the lower front chamber 17 is not included, wherein here a protruding flange 34 is formed which then contributes to forming the front side 4 of the cross member 2. The flange 34 and the upper front chamber 12 are again connected by the web 18.

FIG. 9d shows an embodiment in which the upper and lower front chamber 12, 17 directly border each other and thus are directly adjacent each other. They thus form the front side 4 without the web 18. The main chamber 21 is then also delimited by the upper chord 10, the lower chord 22 and the rear side 14 as well as by parts of the respective rear sides of the front chambers 12, 17.

FIG. 9e shows a variation of the embodiment shown in FIG. 9a. In contrast to the embodiment in FIG. 9a the cross member in FIG. 9e is configured in cross section so that the front side 4 has a curved course. The arch of the curvature faces in longitudinal direction X of the motor vehicle. Therefore in the upper front chamber 12, in relation to the vertical direction Z of the motor vehicle, the upper wall is configured shorter in longitudinal direction X of the motor vehicle than the bottom wall. In the bottom front chamber 17, the upper wall in relation to the vertical direction Z of the motor vehicle is configured longer than the bottom wall, in each case in longitudinal direction of the motor vehicle.

FIGS. 10a to 10f show a comparison of a bumper arrangement 1 according to the invention according to FIGS. 10a to 10c compared to a bumper arrangement 1 known from the state of the art and shown in FIGS. 10d to 10f, in each case illustrating a simplified bumper arrangement without crash box. For this the bumper arrangement according to the invention 1 according to FIG. 10a is in the starting state. According to FIG. 10b a force F impacts the front side 4 of the cross member 2. As a result chord 10 and the lower chord 22 bulge outwardly in relation to the vertical direction Z of the motor vehicle and thus absorb the force F over the deformation path in longitudinal direction X of the motor vehicle. This corresponds to the force path diagram ① according to FIG. 10c. This deformation results in particular in a low-intensity impact. At the same time the upper chord 10 and lower chord 22 of the main chamber 21 push into the rear sides 11, 24 of the two front chambers 12, 17 and thereby deform the rear sides 11, 24 as well as again the respective top side and bottom side of each front chamber 12, 17. Thereby the force F is converted into deformation energy. In particular the crash energy in case of a high-intensity impact is thereby absorbed. This corresponds to the force level in the force path diagram according to FIG. 10c FIG. 10c shows the acting force F and the deformation path in longitudinal direction X of the motor vehicle associated therewith.

In contrast the variant according to FIGS. 10d to 10f show a two-chamber hollow section cross member 36 known from the state of the art. It can be well recognized in FIGS. 10e and 10f that only a force level ① of an impacting force F is realized in longitudinal direction X of the motor vehicle. Overall the force level ① according to FIG. 10f is thus lower than the one in FIG. 10c, and thus cross members 2 known from the state of the art only provide a lower displaceability.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A bumper arrangement for a motor vehicle, comprising:
   a cross member made of a lightweight metal and constructed as multi-chamber section which has at least one front chamber and at least one main chamber, said front chamber being arranged in front of the main chamber in longitudinal direction of the motor vehicle, said main chamber having a greater cross sectional surface than the at least one front chamber,
   said cross member having a front side facing in a driving direction of the motor vehicle and a rear side facing away from the driving direction,
   said front side having a height in vertical direction of the motor vehicle, which is greater than a height of the rear side,
   wherein at least one wall of the front chamber forms a portion of the front side; and
   crash boxes arranged in respective end regions of the cross member for coupling the bumper arrangement with the motor vehicle.

2. The bumper arrangement of claim 1, further comprising two of said front chamber.

3. The bumper arrangement of claim 2, wherein the two front chambers are situated directly adjacent above each other, or are spaced apart at a distance to each other and connected to each other via a web.

4. The bumper arrangement of claim 3, wherein the two front chambers together with the web form the front side.

5. The bumper arrangement of claim 3, wherein the front side is configured planar or curved.

6. The bumper arrangement of claim 2, wherein the two front chambers protrude upwards and downwards over the one chamber in the vertical direction of the motor vehicle.

7. The bumper arrangement of claim 6, wherein the two front chambers protrude upwards and downwards over the one chamber in form of a stepped shoulder.

8. The bumper arrangement of claim 1, wherein the main chamber in cross section is formed by the rear side, an upper chord and a lower chord, portions of the two front chambers and a web extending to the front chamber, and wherein the rear side and the web extend in vertical direction of the motor vehicle and the upper chord and the lower chord extend in longitudinal direction of the motor vehicle, in particular at an angle between −20° and +20° relative to the longitudinal direction of the motor vehicle.

9. The bumper arrangement of claim 8, wherein in cross section the upper chord and the lower chord transition in a middle region into the respective rear side of the two other chambers.

10. The bumper arrangement of claim 1, wherein the cross member has a longitudinal extent which extends in transverse direction of the motor vehicle, and has a curvature over the longitudinal extent, said curvature being oriented in longitudinal direction of the motor vehicle.

11. The bumper arrangement of claim 10, wherein in a middle section of the cross member, the cross member is asymmetrically bent in vertical direction of the motor vehicle.

12. The bumper arrangement of claim 11, wherein the cross member is bent upwards in the middle section in vertical direction of the motor vehicle.

13. The bumper arrangement of claim 1, wherein the cross member in cross section has different wall thicknesses.

14. The bumper arrangement of claim 2, wherein an upper one of the two front chambers has a greater wall thickness relative to a lower one of the two front chambers.

15. The bumper arrangement according of claim 2, wherein each of the two front chambers has a height which corresponds to 20 to 60%, preferably 25 to 50% and in particular 30 to 40% of the height of the main chamber.

16. The bumper arrangement of claim 8, wherein the rear side transitions respectively rounded into the upper chord and into the lower chord.

17. The bumper arrangement of claim 8, wherein the cross member is made of an aluminum alloy, in particular a 6000 or 7000 aluminum alloy, wherein the cross member preferably has a yield strength RP0.2 between 200 and 500 MPa, particularly preferably between 300 MPa and 450 MPa.

18. The bumper arrangement of claim 8, wherein the crash box is configured as hollow section, having a top side and a bottom side, each said top and bottom side having two bulges oriented in vertical direction of the motor vehicle and extending in longitudinal direction of the motor vehicle.

19. The bumper arrangement of claim 8, wherein the upper chord is overlapped by the top side of the crash box and/or the lower chord is overlapped by the bottom side of the crash box and are in particular coupled with the cross member, particularly preferably by means of rivets or a screw connection.

20. The bumper arrangement of claim 19, wherein the top side of the crash box abuts a rear wall of an upper one of the two front chambers, and the bottom side of the crash box abuts a rear wall of a lower one of the two front chambers.

21. The bumper arrangement of claim 17, wherein the crash box has a flange which is oriented laterally in transverse direction of the motor vehicle, said flange abutting the rear wall of the cross member and being in particular coupled with the rear wall of the cross member, in particular by rivets or a screw connection.

22. The bumper arrangement of claim 17, wherein the crash box is configured one-piece and made of a lightweight alloy, in particular aluminum, and has in particular different wall thicknesses in cross section.

23. The bumper arrangement of claim 22, wherein the crash box has strips which extend in longitudinal direction of the motor vehicle, said strips having a greater wall thickness relative to remaining regions of the crash box, said strips being in particular arranged in a region of the bulges.

* * * * *